Dec. 20, 1932.  G. K. TURNER  1,891,852
CHUTE
Filed Aug. 3, 1931  3 Sheets-Sheet 1

G. K. Turner, INVENTOR
BY Victor J. Evans
and Co.
ATTORNEY

Dec. 20, 1932.  G. K. TURNER  1,891,852
CHUTE
Filed Aug. 3, 1931  3 Sheets-Sheet 2
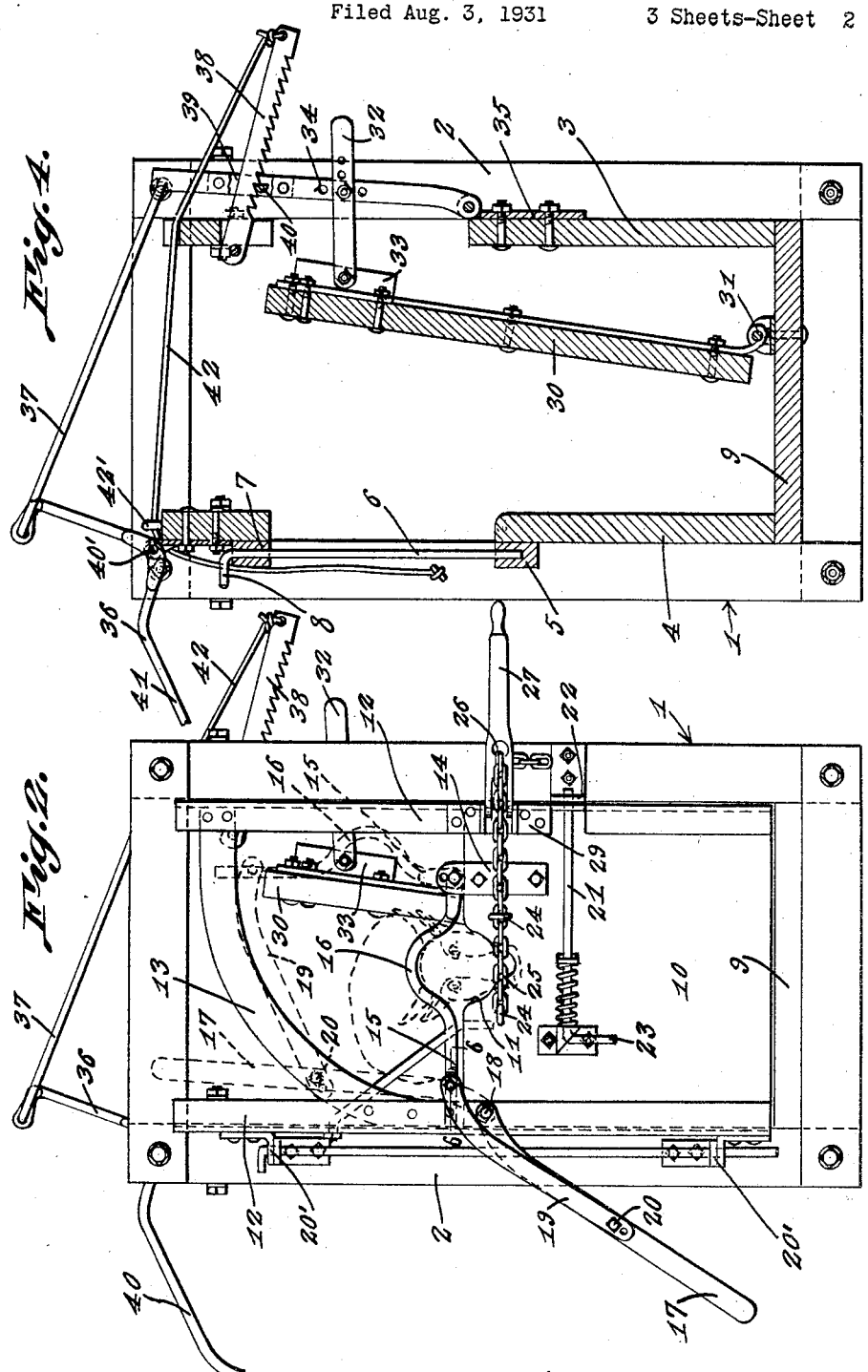

Dec. 20, 1932.  G. K. TURNER  1,891,852
CHUTE
Filed Aug. 3, 1931   3 Sheets-Sheet 3
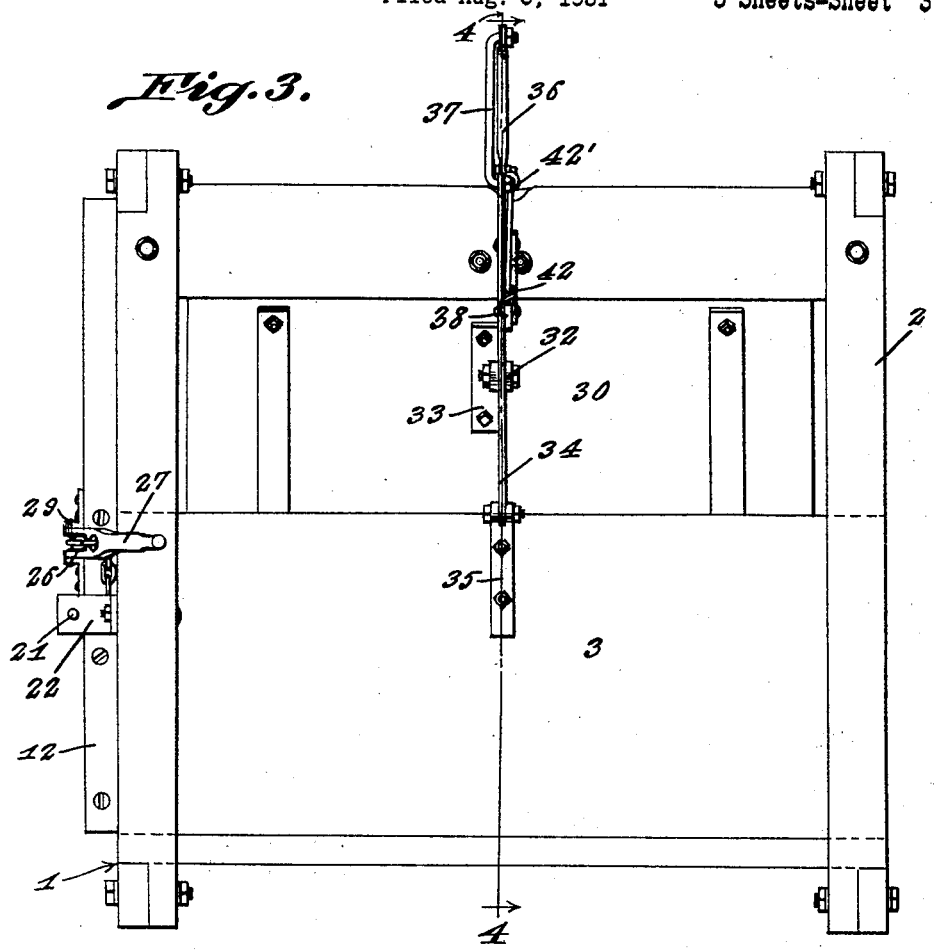

Patented Dec. 20, 1932

1,891,852

UNITED STATES PATENT OFFICE

GEORGE K. TURNER, OF ELIZABETHTOWN, NEW MEXICO

CHUTE

Application filed August 3, 1931. Serial No. 554,892.

This invention relates to chutes especially adapted for holding cattle to permit dehorning, branding and other operations to be successfully and quickly carried out without undue discomfort to an animal and has for the primary object, the provision of a rack or frame in which an animal may be driven and is equipped with means at one end, whereby the animal's neck may be received and held firmly and the nose of the animal drawn downwardly and rearwardly toward the body of the animal so as to position the upper portion of the head and horns of the animal forwardly and in a position whereby the dehorning operation may be easily and quickly accomplished in the usual manner.

Another object of this invention is the provision of a squeeze element in the rack or frame and having an operating means which may be easily and quickly actuated with desired force to hold the animal against one side of the frame or chute in a standing position and prevent the animal from lying or falling down and said squeeze element being so arranged that when brought in operation will have a lifting effect upon the animal and practically maintain the animal's weight off the feet thereof, which with the head holding means renders the animal helpless so that branding and the like may be successfully carried out with the least loss of time and discomfort to the animal and reduce injuries to an animal to a minimum.

A further object of this invention is the provision of a chute of the above stated character which will be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a chute constructed in accordance with my invention.

Figure 2 is a front elevation illustrating the same.

Figure 3 is a side elevation illustrating the device.

Figure 4 is a transverse sectional view taken on the line 4—4 of Figure 3.

Figure 5 is a perspective view illustrating a lever for the nose holding chain or element.

Figure 1:
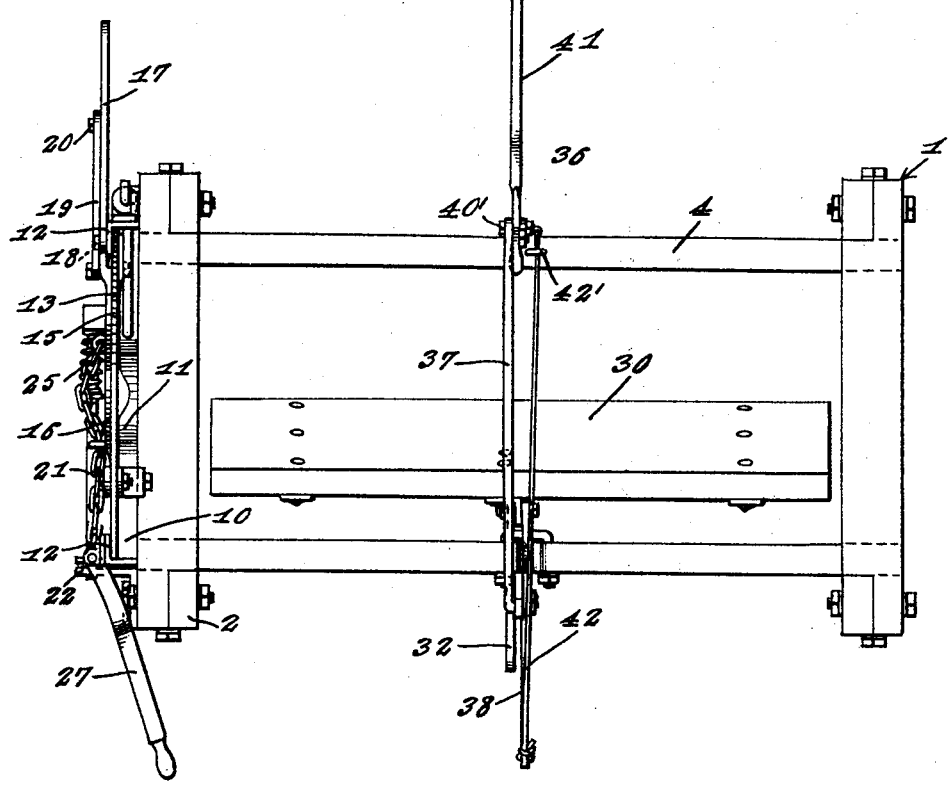
Figure 6:
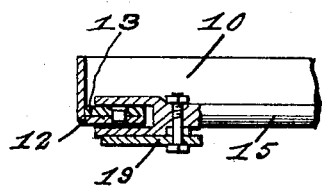
Figure 6 is a fragmentary sectional view illustrating the means of slidably supporting one end of the neck yoke.

Referring in detail to the drawings, the numeral 1 indicates a chute including a frame 2 provided with sides 3 and 4, the upper edges of which are spaced from the upper portions of the frame 2 and the side member 4 has secured to its outer face at its upper edge a rod supporting member 5 provided with a plurality of spaced sockets to receive the lower ends of rods 6 that are slidably mounted in a guide member 7 secured to the upper portions of the frame 2 and have their upper ends angularly disposed to provide handles 8 whereby said rods may be raised and lowered and removed from the device when desired. The rods 6 form an open grating to one side of the chute above the side wall 4. The side walls 3 and 4 rest upon a bottom wall 9 on which the animal is adapted to stand. The ends of the chute are open so that one end of the chute forms an entrance for permitting an animal to be driven into the chute while the opposite end is closed by a hinged gate 10, the upper edge of which terminates in a plane substantially in alignment with the upper edges of the side walls, providing the gate of a height equal to the distance between the throat and front feet of an animal when standing on the bottom 9. A throat and neck notch 11 is formed in the upper edge of the gate 10 to receive the neck of the animal with the head thereof projecting beyond the gate. Vertically disposed channel shaped supporting members 12 are carried by the sides of the gate and terminate at the upper portion of the frame of the chute and are connected by an arcuate shaped guide 13 spaced a sufficient distance from the upper edge of the gate to permit easy passage of an animal's head and neck therethrough. A bracket 14 is secured to the gate 10 adjacent one side edge and has pivoted thereto a neck engaging yoke 15, the free end of which is bifurcated to slidably receive the arcuate shaped guide 13 and one of the walls of one of the channeled shaped members 12. The neck yoke 15 is offset as shown at 16 and may be swung into either a vertical or horizontal position as shown in Figure 2 and when in a vertical position, the animal may easily pass the head and neck through the space between the guide 13 and the upper edge of the gate so that the neck yoke may be swung into a horizontal position to overlie the neck of the animal, with the neck positioned in the offset portion 16. A lever 17 is pivoted to the gate as shown at 18 and has a link 19 pivoted thereto as at 20 and the opposite end of the link is pivoted to the neck yoke 15 adjacent its bifurcated end. The link 19 and the lever 17 are slightly curved as shown in Figure 2 so that by swinging the lever 17 upwardly, or into vertical position as shown in dotted lines in Figure 2, the neck yoke will be supported vertically and after the animal places the neck over the upper edge of the gate, a person may quickly pull the lever 17 downwardly into a full line position as shown in Figure 2 which places the yoke 15 horizontally over the neck of the animal and due to the locations of the pivots of the lever 17 and link 10', the yoke 15 will be prevented from swinging upwardly by the action of the animal throwing the head upwardly.

The gate 10 is hinged to the end of the frame as shown at 20' and is provided with a spring pressed latch bar 21 adapted to engage a keeper 22 carried by the frame of the chute for the purpose of holding the gate in a closed position. A handle 23 is formed on the bar 21 whereby a person may easily disengage the bar from the keeper 22 when desiring to free the gate so that it may be moved into an open position for permitting the animal within the chute to pass outwardly therefrom.

Spaced eye bolts 24 are carried by the gate 10 and arranged at opposite sides of the throat notch 11 and one of the eye bolts has one end of a nose chain 25 secured thereto while the other eye bolt slidably receives the chain which is adapted to pass through a key hole slot 26 of a lever 27. The lever 27 is slightly curved as shown at 28 and bifurcated and pivoted to a bracket 29 secured to the gate. The lever 27 when swung in the direction of the hinged side of the gate places a slack in the chain 25 and the chain is adapted to be passed over the nose of the animal and by swinging the lever 27 in an opposite direction, the slack will be removed from the chain drawing the nose of the animal downwardly, bringing the lower portions of the lower jaw of the animal in engagement with the gate, and which action causes the upper portion of the head and horns of the animal to be extending forwardly and so positioned that the horns may be easily removed in the customary way. With the nose chain 25 and the neck yoke 16 applied to the animal in the manner heretofore described, the animal's head is held in a proper position for easy dehorning and the animal will be prevented from moving the head upwardly, downwardly or laterally, thus permitting the dehorning operation to be successively and quickly carried out. The key hole slot 26 in the lever 27 provides means whereby the chain 25 may be adjustably secured to the lever for increasing and decreasing the slack within the chain so as to accommodate animals of different sizes.

A squeeze board or plate 30 is hinged to the bottom wall 9 as shown at 31 and the length thereof is substantially equal to the distance between the shoulders and hips of an animal and the height slightly greater than the height of an animal and by referring to Figure 4 it will be noted that the squeeze plate 30 is hinged closer to the side wall 3 than the side wall 4 and normally inclined toward the side wall 3 providing a space between itself and the side wall 4 to receive the body of the animal. An arm 32 is pivoted to a bracket 33 carried by the squeeze plate 30 adjacent the upper edge and is in turn pivotally and adjustably connected to an arm 34, the lower end of which is pivoted to a bracket 35 carried by the side wall 3. The upper end of the arm 34 extends a short distance above the frame of the chute and is connected to an operating lever 36 by a link 37 extending transversely of the chute. A pivoted rack bar 38 is carried by the frame of the chute and is slidably received in a guide element 39 on the arm 34 and said guide element carries a pin 40 adapted to engage the teeth of the rack bar for the purpose of holding the squeeze plate 30 in various adjusted positions. The operating lever 36 is of the bell crank type, pivotally mounted as shown at 40' and provided with a handle portion 41 disposed laterally of one side of the chute and in a position whereby a person can readily pull downwardly thereon for the purpose of moving the plate 30 toward the side wall 4 to squeeze an animal therebetween and hold said animal or the body thereof against movement. As the squeeze plate 30 is moved into animal holding position, the rack bar 38 adjusts itself over the pin 40 so as to hold the squeeze plate tightly against one side of the animal forcing the opposite side of the animal against the wall 4 and in close proximity to the bars 6. Due to the inclination of the squeeze plate 30 when in nonanimal holding position, the squeeze plate when being moved to force the animal against the wall 4 will have a tendency to lift the animal upwardly thereby relieving the weight of the animal off the feet thereof and thereby further rendering the animal helpless against self movement. The body of the animal, held in the position just described may be branded, vaccinated or any other operation carried out thereon with ease and quickness on the part of the operator. To give access to the side of the animal after being secured within the chute, the bars 6 may be raised or removed from the chute allowing a person to operate upon the animal over the upper edge of the side wall 4 and still be protected from the feet and legs of the animal.

A flexible operating element 42 is secured to the free end of the rack bar 38 and trained over the upper portion of the frame of the chute through an eye bolt 42' and terminating downwardly upon the side 4 of the chute so that the person operating the lever 41 may easily disengage the rack bar from the pin 40 when desiring to free the squeeze plate 40 from the animal.

In operation, the lever 17 is positioned vertically as shown in dotted lines in Figure 2 and the animal is driven into the chute and as soon as the animal extends the neck and head over the upper edge of the gate 10, the operator swings the lever 17 downwardly, preventing the animal from moving forwardly and rearwardly. The nose chain is then applied to the nose of the animal for the purpose of forcing the nose toward the gate extending the head and horns of the animal forwardly of the gate into position for dehorning. The lever 36 is then moved downwardly forcing the body of the animal againt the side wall 4 thereby cooperating with the yoke 15 and nose chain 25 in holding the animal against movement whereby various operations on the animal can be carried out with safety to the operator and with quickness so as to prevent retaining the animal in the device over a long period of time. After the operation on the animal has been carried out, the animal is then freed and the gate 10 swung to an open position permitting the animal to escape from the chute.

The arrangement and construction of the levers 17 and 41 and their connections to their respective parts permits considerable leverage to be applied to the neck yoke 15 and the squeeze plate 30 thereby permitting a person to hold or easily conquer a large and strong animal.

While I have shown and described the preferred embodiment of my invention, it will be understood that minor changes in construction, combination and arrangement of parts may be made without departing from the spirit and scope of my invention, as claimed.

Having thus described my invention, what I claim is:—

1. A chute comprising an opened end frame, a hinged door for said frame, means for detachably securing the door in frame closing position, said door including vertical members connected by a panel having the upper edge thereof notched to receive the neck of an animal, an arcuate shaped guide connecting the vertical members above the upper edge of the panel, a neck engaging yoke pivoted to the panel at one side of the notch and having its free end bifurcated to slidably engage the guide, a lever pivoted to one of the vertical members, and a link pivoted at one end to the lever and having its other end curved and pivoted to the yoke adjacent its bifurcated end.

2. A chute comprising a stall including side walls having the upper portions thereof opened, means at one end of the stall to secure an animal's neck with the animal standing between the walls, a squeeze board hinged to the bottom of the stall to engage one side of the animal, a lever pivoted to one of the side walls, a link pivoted to the board and to said lever, a rack bar pivoted to said last named side wall and engaging the lever for holding the board in adjusted positions, a pivoted operating medium connected to the lever for adjusting the board and located adjacent the opening of the other side wall, and means for disengaging the rack bar from said lever to permit adjustment of the board.

In testimony whereof I affix my signature.

GEORGE K. TURNER.